United States Patent [19]

Kent et al.

[11] Patent Number: 5,054,602

[45] Date of Patent: Oct. 8, 1991

[54] SORTING SYSTEM

[75] Inventors: Graham B. Kent, Almondsbury; Moolamkuzhiel R. V. Nair, Freshbrook, both of United Kingdom

[73] Assignee: The Post Office, London, United Kingdom

[21] Appl. No.: 675,114

[22] Filed: Mar. 25, 1991

Related U.S. Application Data

[63] Continuation of Ser. No. 419,882, Oct. 11, 1989, abandoned.

[30] Foreign Application Priority Data

Jun. 23, 1989 [GB] United Kingdom ................. 8914412

[51] Int. Cl.[5] ............................................. B65G 47/46

[52] U.S. Cl. .................................. 198/370; 198/349.6

[58] Field of Search .................. 198/349.5, 349.6, 359, 198/366, 362, 365, 369, 370, 372, 436, 437; 209/584, 900, 922; 414/398

[56] References Cited

U.S. PATENT DOCUMENTS

| | | | |
|---|---|---|---|
| D. 73,921 | 10/1910 | Dodge . | |
| D. 296,489 | 6/1988 | Nair . | |
| 803,119 | 10/1905 | Logan . | |
| 1,784,272 | 12/1930 | Constable . | |
| 1,800,067 | 4/1931 | Godinez . | |
| 1,959,736 | 5/1934 | Rademacher . | |
| 2,326,504 | 7/1941 | Smith . | |
| 3,351,217 | 11/1967 | Sassen et al. | 198/370 |
| 3,357,539 | 12/1967 | Naslund | 198/366 |
| 3,565,226 | 2/1971 | Winchester . | |
| 3,755,878 | 9/1973 | Henning . | |
| 3,976,176 | 8/1976 | Kurtz et al. . | |
| 3,977,513 | 8/1976 | Rushforth | 198/365 |
| 4,010,842 | 3/1977 | Smith . | |
| 4,286,702 | 9/1981 | Langen . | |
| 4,726,456 | 2/1988 | Hogsett . | |

FOREIGN PATENT DOCUMENTS

| | | | |
|---|---|---|---|
| 54248 | 4/1985 | Canada . | |
| 1242986 | 10/1988 | Canada | 198/349.6 |
| 736733 | 6/1943 | Fed. Rep. of Germany . | |
| 1370043 | 6/1963 | France . | |
| 556609 | 2/1957 | Italy . | |
| 59-227613 | 12/1984 | Japan . | |
| 27595 | of 1910 | United Kingdom . | |
| 446669 | 4/1935 | United Kingdom . | |
| 468721 | 7/1937 | United Kingdom . | |
| 744073 | 7/1954 | United Kingdom . | |
| 986692 | 3/1965 | United Kingdom . | |
| 1034647 | 6/1966 | United Kingdom . | |
| 2070576 | 9/1981 | United Kingdom . | |
| 2123375 | 10/1985 | United Kingdom . | |

OTHER PUBLICATIONS

Press Release: "Spiral Chute Smooths the Flow," British Post Office, Dec. 6, 1983.

"Spiral Chute", *Factory Equipment & Materials,* Jan. 1984.

"Safeglide Spiral Parcel Chute", *Venture Product News,* General Electric.

"Spiral Chute Smooths the Flow", *New Product News,* Jan. 25, 1984, Genium Publishing Corp.

"Spiral Chute Smooths the Flow", British Trade Topics.

"The Post Office Postal Technology", British Post Office.

(List continued on next page.)

*Primary Examiner*—Joseph E. Valenza

*Attorney, Agent, or Firm*—Merchant & Gould, Smith, Edell, Welter & Schmidt

[57] ABSTRACT

A sorting system comprises a number of sorting conveyors (1, 2 --- 12) each being capable of selectively discharging items fed onto the conveyor at an input thereto, from any one of a number of destination outlets and a plurality of aggregating conveyors (21, 22 --- 29) corresponding in number to that of the outlets of each sorting conveyor and extending transversely of the sorting conveyors, each aggregating conveyor being capable of receiving items from the respective sorting conveyors at a corresponding outlet in each case and of feeding the received items towards an output.

2 Claims, 3 Drawing Sheets

OTHER PUBLICATIONS

"Post Office Results of R & D", *Materials Handling News,* Jul. 1986.
"Constant Velocity Chute", *Post Office Research Centre,* The British Post Office, 1985.
"Ian 'Chutes' Down Old Systems", *The News,* Apr. 1987.
"Lower the Cost of Lowering Your Product", PORTEC Flomaster ® Division.
"Spiralglide TM Molded Fiberglass Spiral Chute", PORTEC Flomaster ® Division.
"Recent Development in Chain Conveyors, Container Handling and Chutes", Goodison, London 1979.
"Parcel Sorting Now and In the Future", Hoegh, London 1979.
"The New Profile Chute", London 1979.
"Easy Let-Down Spiral and Ladder Chutes", A Telecom Corporation Company, Meyer Machine Company, Bulletin 931-c.
"Wendelrutschen fur antriebsfrele und schonende Abswartsforderund" Eisenwerk Gebr. Wohr KG Stahlbau, Kranbau, Forderanlagen, D-7084 Aalen-Unterkochen; English translation enclosed.
"Italian chutes made in Italy".
Notes for presentation at Sales Conference Denver, Jan. 16-18, 1985, Dr. Slarford.
Spivakovsky and V. Dyachkov, "Conveyors and Related Equipment", Peace Publishers, pp. 408-413.
"Safeglide TM ", The British Post Office pamphlet.
"Innovation and Excellence in Postal Technology", The British Post Office Research Centre pamphlet.
"How to Chute Down the Cost of Handling Newspapers", Safeglide TM .

SORTING SYSTEM

This is a continuation of application Ser. No. 07/419,882, filed Oct. 11, 1989 now abandoned.

This is invention relates to sorting equipment more particularly but not exclusively for sorting parcels and has for its object the provision of an improved such system.

Parcel sorting as is well known, may be achieved by means of a sorting conveyor onto which the parcels are fed and which has a number of destination outlets each providing a sorting selection, from which the parcels may be discharged selectively according to their destination.

Where the number of selections is large but the parcel throughput is low, economies may be achieved in using a single sorting conveyor but using the conveyor in two stages, a primary sorting stage after which the thus sorted parcels are stored and a secondary sorting stage for which the outputs of the machine are redesignated, to complete the sorting operation.

The invention is concerned with the solution to the problem posed by limitations of space when higher article throughput are required.

According to the present invention, a sorting system comprises a number of sorting conveyors each being capable of selectively discharging items fed onto the conveyor at an input thereto, from any one of a number of destination outlets and a plurality of aggregating conveyors corresponding in number to that of the outlets of each sorting conveyor and extending transversely of the sorting conveyors, each aggregating conveyor being capable of receiving items from the respective sorting conveyors at a corresponding outlet in each case and of feeding the received items towards an output.

In one form, the aggregating conveyors are each arranged to feed the received items to a respective one of a number of secondary sorting conveyors also capable of selectively discharging the items from any one of a number of destination outlets.

Preferably the system incorporates means at each outlet of each first mentioned sorting conveyor for transferring items to the associated aggregating conveyor, the aggregating conveyors being at a different level to that of the sorting conveyors.

The aggregating and secondary sorting conveyors may be at different levels and further transfer means be provided for transferring the items from one level to the other between each aggregating conveyor and the associated secondary conveyor.

Preferably the above-mentioned transfer means comprise chutes. A particularly suitable chute is that of a construction such that articles descend the chute at a constant speed or at least under conditions in which their speed does not exceed a given maximum.

Preferably each primary conveyor is provided with a plurality of feed conveyors which merge onto the primary conveyor.

Two arrangements of sorting system in accordance with the invention will now be described by way of example with reference to the accompanying drawings, in which.

Figure 1:
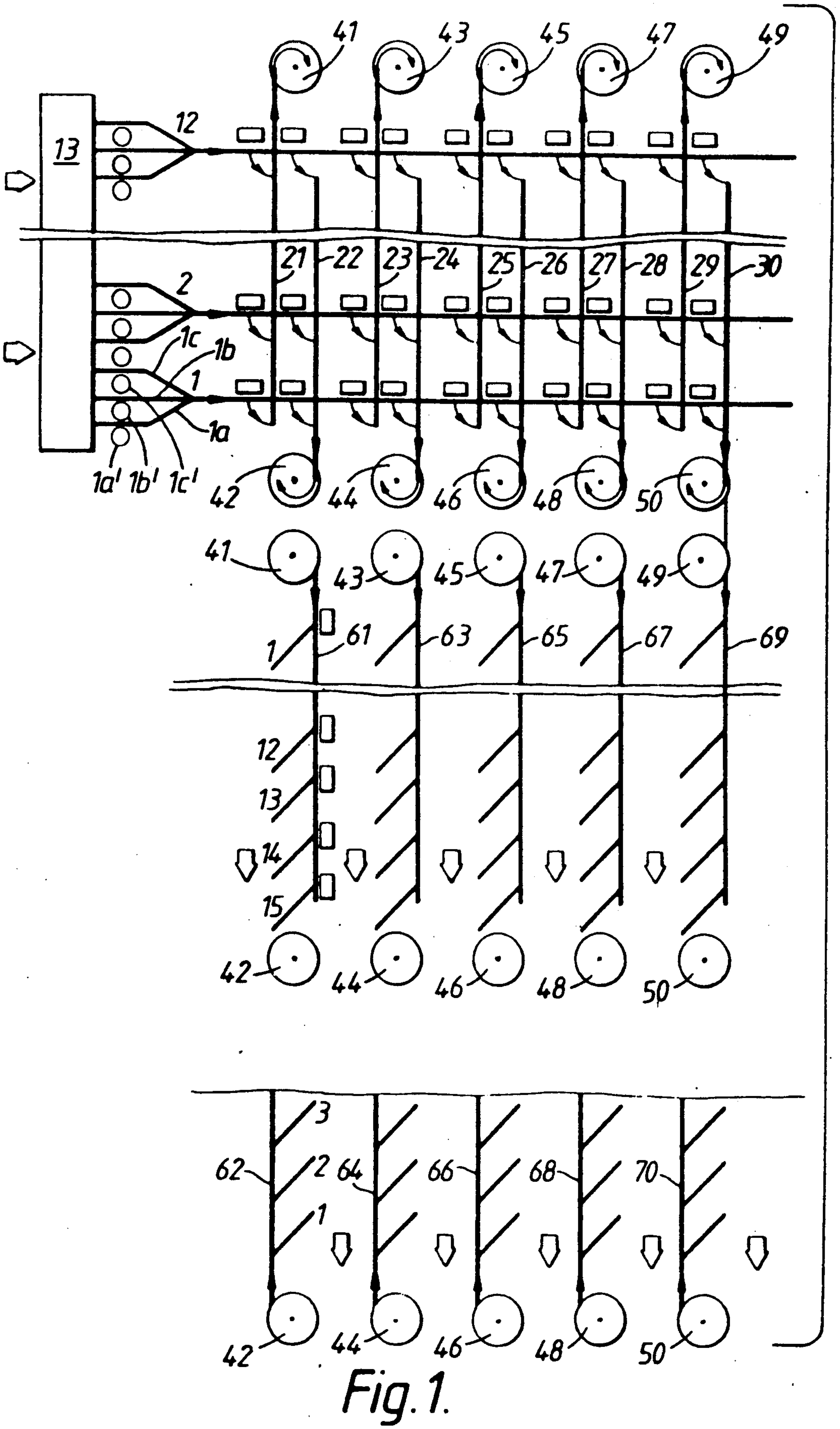
FIG. 1 shows a diagrammatic layout of the first arrangement.
Figure 2:
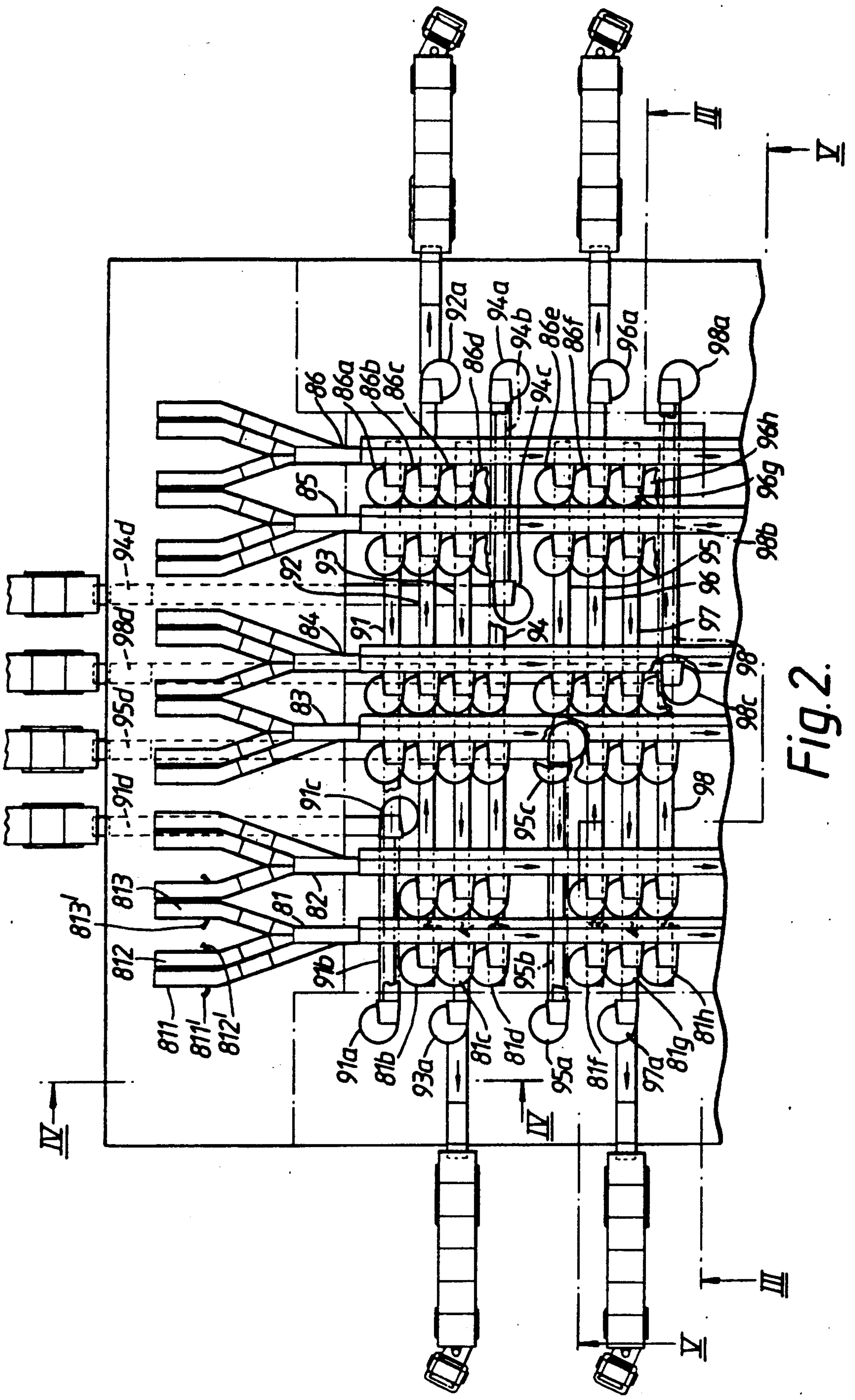
FIG. 2 shows a partial layout of the second arrangement.
Figure 3:
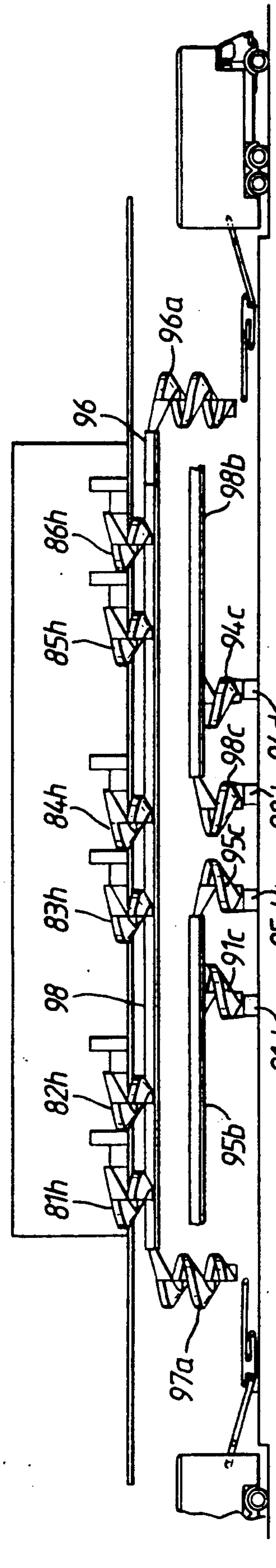
FIGS. 3, 4 and 5 are sections taken along the lines A—A, B—B and C—C of FIG. 2.
Figure 4:
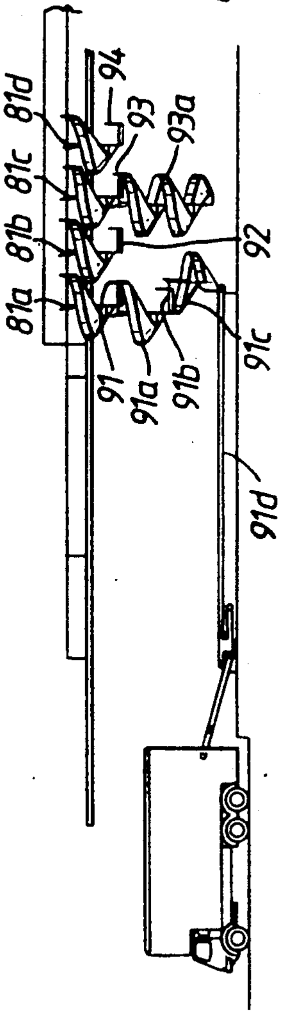
Figure 5:
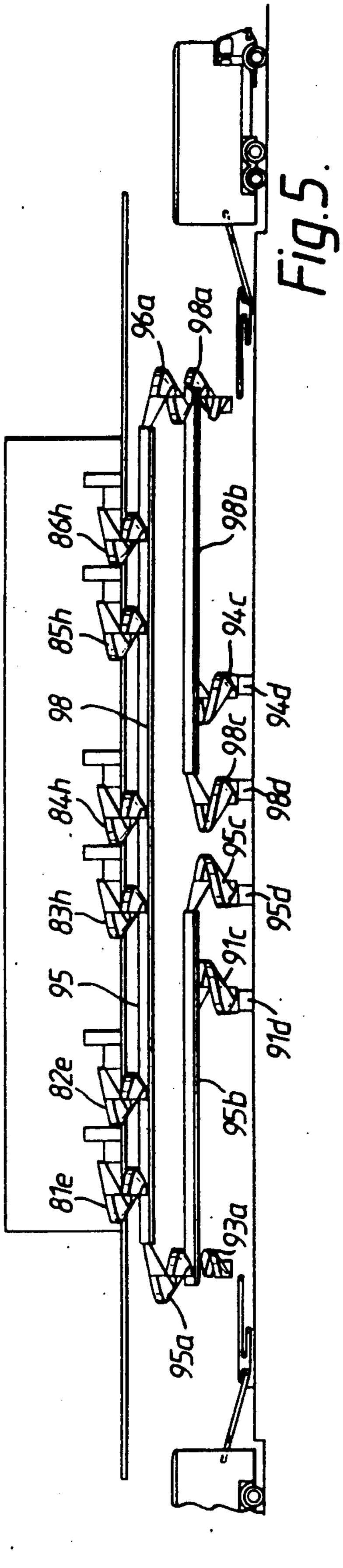

Referring to FIG. 1, the system comprises a series of primary conveyors 1 to 12. Each primary conveyor is fed from an infeed 13 via three feed conveyors 1*a*, 1*b*, 1*c* etc. which merge with the main conveyor. Furthermore coding positions are indicated at 1*a'*, 1*b'* etc. A multi input feed arrangement is described in UK Patent Specification No. 2123375. Each conveyor has ten outlets as shown and each outlet is provided with a diverter. Conveniently, the diverter is of the construction described in copending patent application Ser. No. 373,929. Extending transversely of the conveyors 1 to 12 are ten aggregating conveyors 21 to 30. Each aggregating conveyor in this way receives items from the respective sorting conveyors at a corresponding outlet in each case. Adjacent aggregating conveyors run in opposite directions and lead to chutes 41 to 50. These chutes are arranged to feed items fed into the chute by the respective aggregating conveyor to secondary conveyors 61 to 70, the conveyors 61, 63, 65, 67 and 69 being arranged on a first level below that of the primary conveyors and the remaining secondary conveyors being arranged on a second level below that of the first level. Each chute is preferably constructed so that articles descend the chute at a constant speed or at least under conditions in which their speed does not exceed a given maximum. A chute of this construction is marketed under the name Safeglide (Registered Trade Mark). Each secondary conveyor has 15 outlets again controlled by a diverter which may be of the same construction as the above-mentioned diverter.

As will be immediately apparent, the arrangements provide first and second stage sorting in that an item on any one of the primary conveyors may be fed to any one of the secondary conveyors and the provision of ten secondary conveyors each with 15 outlets, gives, of course, a total number of 150 outlets. Greatly improved throughputs result, throughputs of the order of 20–40 thousand items/hour being achievable.

In use of this arrangement, parcels are coded at the coding positions and placed on the appropriate feed conveyor to be conveyed to the particular sorting conveyor. The coding may be positional in the sense that it is only the position of the parcel when placed on the feed conveyor which is coded, that is stored in a memory together with an indication of the destination of the parcel. Means, for example, as described in patent specification Ser No. 2,123,375, are provided at or near each merging point to space the parcels and to ensure that the positions of the individual parcels as entered into the memory is not lost. The memory is of course linked to the conveyors and positional coding requires that the primary sorting, aggregating and secondary sorting conveyors are run synchronously and that the position of the parcel is not lost in transit or if temporarily lost, is restored.

The parcels then enter their particular primary sorting conveyor and will be diverted from that conveyor according to the sorting selection required for the destination of the parcels, onto the appropriate one of the aggregating conveyors to pass from this conveyor to the particular chute and thence to the particular secondary conveyor. On reaching the outlet of the secondary conveyor corresponding to the destination of the parcel, the parcel is diverted into a suitable receptacle.

It will be appreciated that the use of Safeglide (Registered Trade Mark) chutes will normally ensure that parcels retain their station (that is their position on the conveyor system as logged in the memory).

Alternatively, the coding may be actual in the sense that the parcel is physically marked with machine readable coding indicia, for example a bar coding, which may be applied remotely, giving an indication of the destination of the parcel which code will generally include an indication of the primary selection required and also that of the secondary selection. In this case, the operation of the machine will be facilitated in that it is not necessary that the primary, aggregating and secondary conveyors be run synchronously. Readers will be incorporated in each primary and secondary conveyor for reading the parcel codes but still in this case, the use of the above-described chutes is advantageous in that with this construction of chute a parcel is more likely to retain its orientation due to the controlled descending movement provided by the chute.

Turning now to FIGS. 2 to 5, here six sorting conveyors 81 to 86 are provided each having three merging feed conveyors 811, 812 and 813 etc. as before. Furthermore, each feed conveyor is provided with a coding position 811', 812' and 813' etc. Each sorting conveyor has a number of destination outlets of which eight are shown. The outlets which are controlled by diverters which may also be of the above-described construction, lead into chutes 81*b*, 81*c* . . . 85*g*, 85*h*.

The chutes are of the same construction as those described in the first embodiment. Disposed below the sorting conveyors and extending transversely thereto are a number of aggregating conveyors 91 to 98, each of which is arranged to receive items from the chutes associated with the respective conveyors 81 to 86 at a corresponding outlet in each case.

Each of the aggregating conveyors 92, 93, 96 and 97 feed the received items to an outlet chute 92*a*, 93*a*, 96*a* and 97*a* from whence the items are conveyed direct to waiting vehicles as shown. However, in the case of the aggregating conveyors 91, 94, 95 and 98 the outlet chutes 91*a*, 94*a*, 95*a* and 98*a* to which the items are fed, transfer the items to transverse conveyors 91*b*, 94*b*, 95*b* and 98*b* from which the items are transferred by 90 degree chutes 91*c*, 94*c*, 95*c* and 98*c* to longitudinal conveyors 91*d*, 94*d*, 95*d* and 98*d* arranged to transfer the items to waiting vehicles as shown.

Whilst the second arrangement does not provide two-stage sorting, the matrix arrangement of sorting conveyors and aggregating conveyors provides for a greatly increased throughput of items in a given space.

We claim:

1. A sorting system comprising:

(a) a plurality of sorting conveyors each being capable of selectively discharging items fed onto the conveyor at an input thereto, from any one number of destination outlets;

(b) a plurality of aggregating conveyors corresponding in number to that of the outlets of each sorting conveyor and extending transversely of the sorting conveyors, each aggregating conveyor being capable of receiving items from the respective sorting conveyors at a corresponding outlet and of feeding the received items towards an output;

(c) means at each outlet of each sorting conveyor for transferring items to the associated aggregating conveyor, the aggregating conveyors being at a lower level to that of the sorting conveyors; and (d) a plurality of secondary sorting conveyors corresponding in number to that of the aggregating conveyors and means for transferring the aggregated items from each aggregating conveyor to a respective one of the secondary conveyors which are at a lower level to that of the aggregating conveyors, each secondary conveyor being capable of selectively discharging the items from any one of a number of destination outlets;

(e) said means for transferring items from the sorting to the aggregating conveyors including a helical chute associated with the outlet of each sorting conveyor, which is of a construction such that items descend the chute at a constant controlled speed or at least under conditions in which their speed does not exceed a controlled maximum.

2. A sorting system as set forth in claim 1, in which each primary conveyor is provided with a plurality of feed conveyors which merge onto the primary conveyor.

* * * * *